Jan. 11, 1972  R. W. YOUNGS  3,634,288
PREPARATION OF HYDROPHOBIC SILICA SOL FOR USE
AS ANTIFOAMING AGENT
Filed April 16, 1969  2 Sheets-Sheet 1

Inventor
Roger W. Youngs
By Kinzer, Dorn and Ziekert
Attorneys

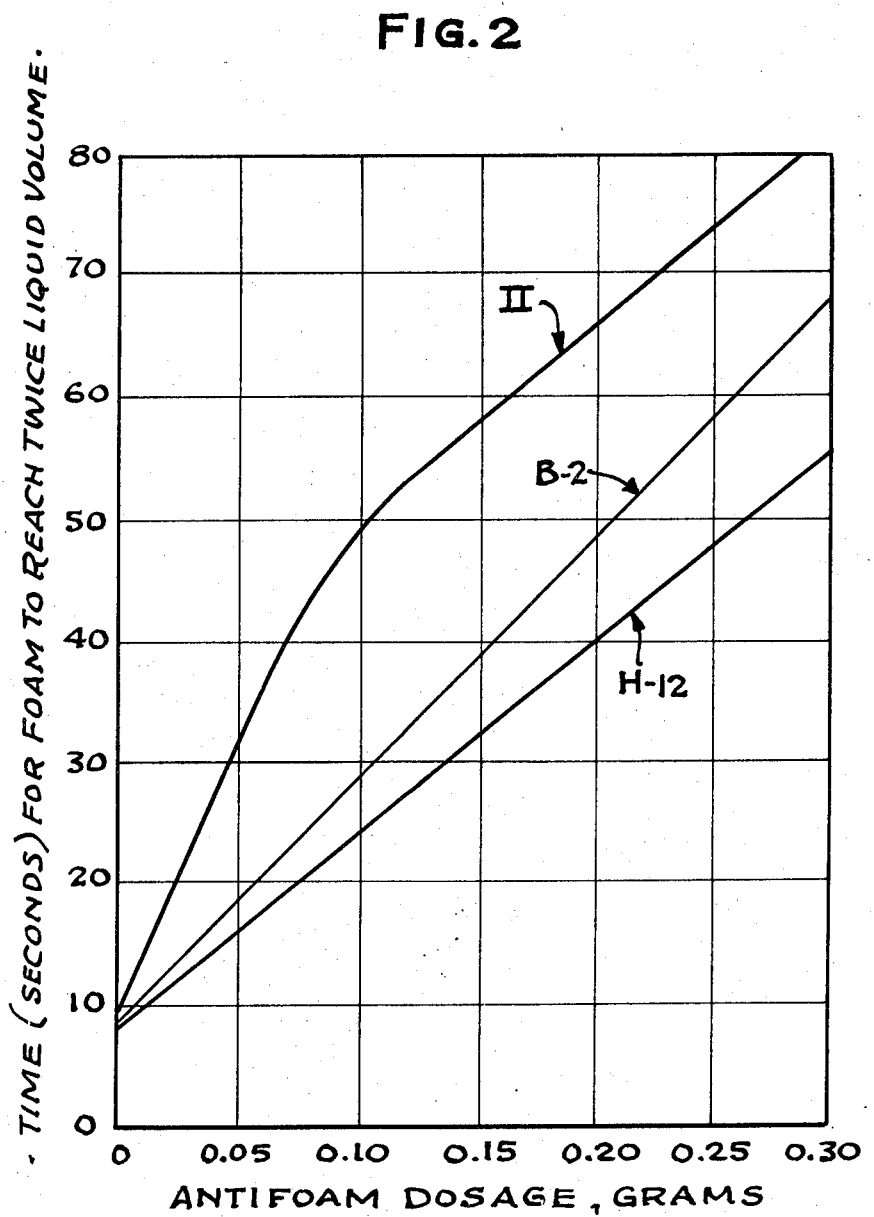

United States Patent Office 3,634,288
Patented Jan. 11, 1972

3,634,288
PREPARATION OF HYDROPHOBIC SILICA SOL
FOR USE AS ANTIFOAMING AGENT
Roger W. Youngs, Hinsdale, Ill., assignor to Nalco
Chemical Company, Chicago, Ill.
Filed Apr. 16, 1969, Ser. No. 816,646
Int. Cl. B01d *19/04;* B01j *13/00;* C01b *33/14*
U.S. Cl. 252—358      3 Claims

ABSTRACT OF THE DISCLOSURE

A superior hydrophobic silica emulsion in oil, useful principally as an antifoaming agent, is prepared by starting with a silica hydrosol emulsified oil. Water is stripped from the emulsion and the emulsion system is then reacted with a polysiloxane which renders the oil-dispersed silica particles (sol dimension) hydrophobic.

---

Figure 1:
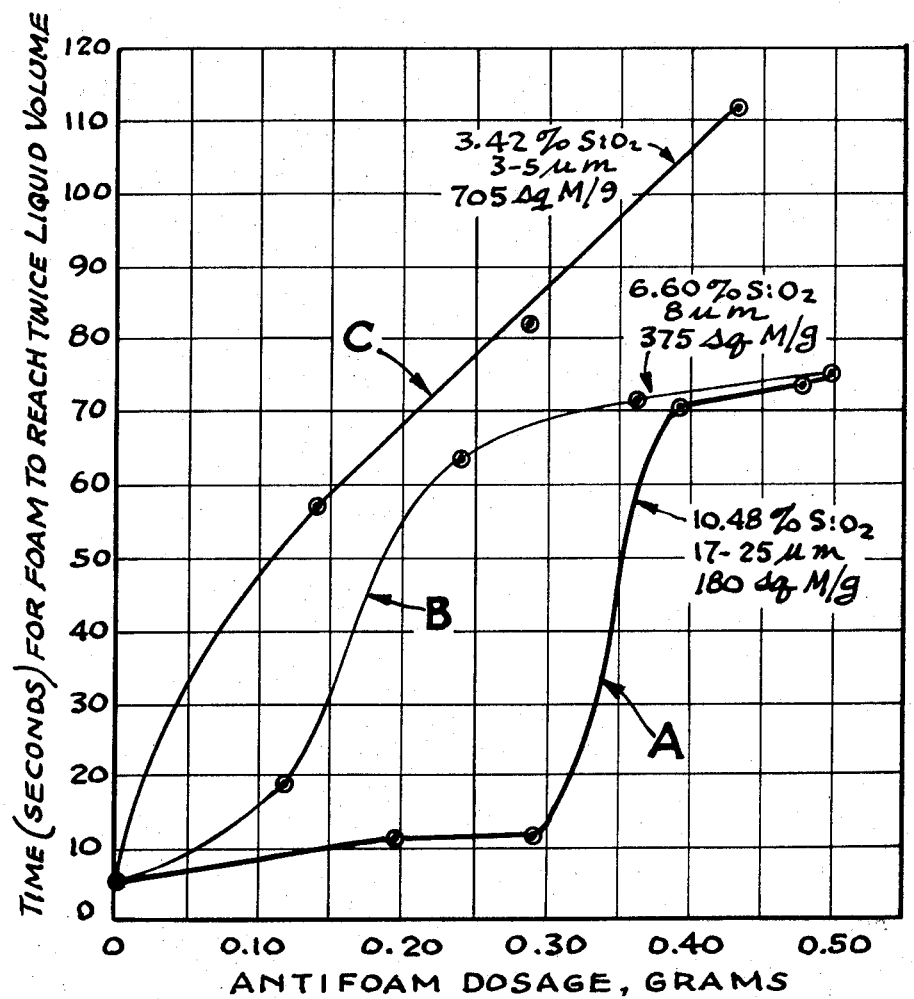

This invention relates to preparation by emulsion technology of a hydrophobic silica and starting with a hydrophilic silica.

Foaming of a liquid stock is often responsible for inefficiency, notably in the paper pulp industry, in the manufacture of latex paints, and in the recovery of unused monomers during production of synthetic rubber. Resort to rather expensive antifoamers is justified.

The primary object of the present invention is to attain increased efficiency in an antifoamer characterized by the presence of hydrophobic silica and to accomplish this by producing an emulsion of hydrophobic silica.

More specifically an object of the present invention is to produce hydrophobic silica of extremely small particle size attained by emulsifying (in an oil dispersion medium) hydrophilic silica to which is coupled a hydrophobic modifier, and then stripping the water content, producing an end product in the form of a hydrophobic silica contained in the oil medium. By preparing an emulsion, it is possible to produce grades of antifoamers in which activity varies with the particle size.

Other and further objects of the present invention will be apparent from the following description and claims and are illustrated in the accompanying drawing which, by way of illustration, shows preferred embodiments of the present invention and the principles thereof and what is now considered to be the best mode contemplated for applying these principles. Other embodiments of the invention embodying the same or equivalent principles may be used and changes may be made as desired by those skilled in the art without departing from the present invention and the purview of the appended claims.

In the drawings:

FIGS. 1 and 2 are graphs showing activity of certain antifoam agents.

Under the present invention, silica in an aqueous medium is emulsified in a suitable oil. The source of silica may be of hydrosol or sodium silicate dissolved in water, each of which is characteristic of a hydrophilic silica. The hydrophilic silica is rendered hydrophobic by attaching a hydrophobic surfactant to the silica —OH groups, and water is stripped from the system. The resultant products, hydrophobic silica, of extremely small particle size dispersed in an oil displays remarkable antifoaming propensity. Example 1 to follow presents a method of obtaining the product.

EXAMPLE 1

| Component: | Charge (pounds) |
|---|---|
| Paraffin oil (or mineral seal oil) | 900.8 |
| Silica hydrosol (15% $SiO_2$; 3–5 m$\mu$ particle size) | 225.2 |
| Silicone oil (dimethyl polysiloxane 50 cs.) | 11.3 |
| Glyceride (Atmul 84 grade) | 22.5 |
| Stearic acid (rubber grade) | 11.3 |

(I) The reactor, topped by a condenser, is charged with the paraffin oil (the oleic dispersing medium), silicone oil, glyceride and stearic acid, with agitation. The free-board area within the reactor is then subjected to a vacuum of 100–150 mm. Hg, whereupon the reactor is charged with the silica sol while continuing to agitate the mixture, producing the desired emulsion.

(II) While maintaining the vacuum, and keeping the temperature within a 60°–65° range, water is slowly distilled from the emulsion, continuing agitation. The temperature will begin to rise when the water has been removed. Vacuum is maintained until a temperature of 160° C. is reached, whereupon the vacuum is broken by admission of nitrogen to the free-board area. The temperature of the mixture is raised to 250° C., held for four hours to cause the silicone oil to attach to the silica particles, and then cooled to room temperature. The product as thus prepared is useful as an antifoaming agent as hereinafter shown, but it may be subsequently homogenized if desired.

While the silicone oil is preferably the one specified, any other silicone oil presenting alkyl or phenyl groups may be used.

The process set forth in Example 1 produces a hydrophobic-silica defoaming agent (stage II) of greatly enhanced activity and is quite unusual in that hydrophobicity is attained from a hydrophilic starting material, namely, the silica sol. Preferably, this sol is of small particle size, five millimicrons or less particle (average) diameter, and hence a sodium silicate solution may also be used, provided it is acidified to a pH of about 3–10 in situ during emulsification. The concentration of silica in the aqueous medium, in any event, is one of choice, and one need only use enough oil (paraffin oil or mineral seal oil or both) and emulsifier to obtain micelle formation. Superior emulsification is obtained when using both the glyceride and stearic acid, but other emulsifying agents may be used, as hereinafter explained.

When water is stripped from the emulsion system, the silicone oil renders the silica completely hydrophobic, the silicone attaching itself to the colloidal silica particles as the mixture is heated. Homogenization is simply to assure that a highly dispersed state is indeed attained.

The silica particles serve as a carrier for the silicone oil which is the fundamental surface active agent. By emulsifying the silica particles in oil, their growth or agglomeration is prevented, which is to say that these particles are spread out or randomly scattered and deagglomerated, so to speak, and highly susceptible to union with the silicone oil which becomes scattered and deagglomerated to the same degree. The model is fundamentally physical except for chemical or bonding affinity between silica and the silicone. However, it is found that the combined emulsifier, glyceride-stearic acid, produces a superior product and helps to prevent foaming during the water strip.

In any event, the end product at stage II may be classified as an emulsion-prepared hydrophobic silica-silicone oil complex, product II hereinafter.

While the effectiveness of an antifoam may be determined in many different ways, depending upon the nature of the system to be defoamed, one field test used in the paper mill industry is to determine the amount of defoaming agent required to hold foaming to some standard measure which naturally remains constant for all agents tested. In Table 1, the amount of antifoam required to hold to the standard for ½ hour is specified in grams. It should be understood that testing was with a field-grade stock liquor representing one actual stage of paper manufacture.

Table 1

| Antifoam product: | Amount |
|---|---|
| H–12 | 86.4 |
| Product II | 72.0 |

The H–12 product was selected as the most effective of the hydrophobic silica defoamers disclosed in U.S. Pat. No. 3,076,768 in which the silica was precipitated from a water solution of sodium silicate.

Product II, the more effective defoamer by about twenty percent, was prepared in accordance with Example 1 hereof. The field test thus conducted established that a superior defoaming agent could be obtained in the first instance in accordance with the procedure of Example 1 where a hydrophilic silica sol (or alternatively a sodium silicate water solution of the same solids content) is emulsified in oil (paraffin oil or mineral seal oil), stripped of water and rendered hydrophobic by a silicone oil.

Having established superiority in a hydrophobic silica sol prepared by emulsion techniques, rather than by precipitation, tests were run to determine efficiency of this anti-foaming agent in terms of size of the silica particles in the sol. Referring to FIG. 1, this is a series of graphs in which efficiency of the antifoam agent is determined on the basis of time (seconds) for a foam to reach twice the volume of the liquid from which the foam is developed. The liquid was typical of a pulp mill liquor. In this connection it will be appreciated that as the time to develop the foam increases, so the efficiency of the antifoam agent increases.

More specifically, with regard to FIG. 1, the three antifoam agents A, B and C were each prepared in accordance with Example 1 specified above. The three antifoam agents A, B and C differed only with respect to the particle size of the silica particles in the hydrophilic sol used as one of the starting materials. The average particle size, antifoam agent A, was 17 to 25 millimicrons (180 square meters/gram); agent B was one in which the average size of the silica particles was approximately 8 millimicrons (375 square meters/gram) and in agent C the particle size was in the range of 3 to 5 millimicrons, equivalent to 705 square meters/gram. Increasing efficiency as the average particle size was decreased is obvious from the data in FIG. 1, and thus it will be seen that under and in accordance with the present invention, by utilizing emulsion techniques, it is possible to produce antifoamers in which efficiency may be predetermined in terms of the particle size of the starting sol.

Superiority of the emulsion-prepared antifoam of this invention, compared to commercially available hydrophobic antifoamers, was verified by laboratory testing, FIG. 2. The coordinates in FIG. 2 are self-explanatory. Products II and H–12, FIG. 2, are those identified in Table 1, and product B–2 was hydrophobic clay particles dispersed in oil and combined with an effective spreading agent as a commercially available antifoamer. The foaming liquid used in the test, FIG. 2, was again typical of a pulp mill liquor.

Another example of the invention is is follows:

EXAMPLE 2

| Component: | Charge (percent) |
|---|---|
| Paraffin oil | 67.8 |
| Silica hydrosol (15% $SiO_2$, 3–5 m$\mu$) | 25.9 |
| Silicone oil (dimethyl polysiloxane) | 1.5 |
| Oleic acid | 1.7 |
| Triton X15 | 3.1 |
| | 100.0 |

These components are processed as in Example 1, oleic acid and Triton X15 being substituted for the combination of glyceride and stearic acid.

It will be seen from the foregoing that under and in accordance with the present invention a hydrophobic silica antifoaming agent of enhanced activity is attained through emulsification of a hydrophilic silica as a starting material, and that degrees of activity may be achieved by varying the particle size of the silica in the starting material. Hydrophobicity is preferably imparted by a silicone oil, but this is only a preferred surfactant with respect to which there may be substitution by high boiling alcohols, quaternary amines, trichlorosilane, etc., inasmuch as the chosen surfactant may be any one of a variety of surfactants capable of bonding to the silica hydrosol —OH groups presented by the aqueous silica system. Similarly, the emulsifying agent may be varied so long as it presents the proper HLB (hydrophilic-liophilic balance) in the range of about 8 to 12.

Variations in the relative amounts of components may be practiced depending upon how much silica and surface activity (silicone oil) is desired in the system, and how easily emulsification is achieved, with the equipment used. The test systems for the data of FIGS. 1 and 2 were fully equivalent, and it will be recognized that product C of the present invention, FIG. 1, consistently outperformed the commercially available hydrophobic silica, product H–12.

What is claimed is:

1. A method of preparing a hydrophobic silica sol, for use as an antifoaming agent comprising, emulsifying a silica hydrosol in an oil dispersing medium, stripping water from the emulsified system at a predetermined temperature; and thereafter, in the presence of a polysiloxane surfactant, elevating the temperature of the non-aqueous emulsified system and maintaining it at the elevated temperature for a sufficient time to allow the surfactant to react with and attach to the silica —OH groups, resulting in an oil dispersion of the hydrophobic silica.

2. A method according to claim 1 in which the silica hydrosol is of particle size as small as three to five millimicrons.

3. A method according to claim 2 in which the polysiloxane is dimethyl polysiloxane and in which the emulsion is produced by an emulsifying agent having an HLB value in the range of about 8 to 12.

References Cited

UNITED STATES PATENTS

| 2,802,850 | 8/1957 | Wetzel | 252—313 X |
| 2,891,875 | 6/1959 | Phreaner | 252—313 X |
| 3,267,042 | 8/1966 | Domba | 252—358 X |

RICHARD D. LOVERING, Primary Examiner

U.S. Cl. X.R.

106—308 Q; 117—100 S; 252—309, 313 S